US012738994B2

(12) United States Patent
Rupasinghe et al.

(10) Patent No.: US 12,738,994 B2
(45) Date of Patent: Sep. 15, 2026

(54) THROUGHPUT PREDICTION USING UL METRICS AND/OR REPORTED CSI

(71) Applicant: Samsung Electronics Co., Ltd., Suwon-si (KR)

(72) Inventors: R A Nadisanka Perera Rupasinghe, Allen, TX (US); Tiexing Wang, Plano, TX (US); Yang Li, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 18/353,841

(22) Filed: Jul. 17, 2023

(65) Prior Publication Data

US 2024/0056144 A1 Feb. 15, 2024

Related U.S. Application Data

(60) Provisional application No. 63/464,116, filed on May 4, 2023, provisional application No. 63/398,149, filed on Aug. 15, 2022.

(51) Int. Cl.

*H04B 17/373* (2015.01)
*H04B 7/06* (2006.01)
*H04B 17/336* (2015.01)

(52) U.S. Cl.

CPC ......... *H04B 7/0608* (2013.01); *H04B 17/336* (2015.01); *H04B 17/373* (2015.01)

(58) Field of Classification Search

None

See application file for complete search history.

(56) References Cited

U.S. PATENT DOCUMENTS

| | | | | |
|---|---|---|---|---|
| 9,496,937 | B1 | 11/2016 | Wang et al. | |
| 11,546,029 | B2 | 1/2023 | Soriaga et al. | |
| 2011/0250926 | A1* | 10/2011 | Wietfeldt | H01Q 1/243 455/525 |
| 2012/0021702 | A1* | 1/2012 | Liu | H04W 52/0251 455/90.2 |
| 2020/0186227 | A1* | 6/2020 | Reider | H04B 7/0626 |
| 2020/0396035 | A1* | 12/2020 | Yu | H04L 5/0089 |
| 2022/0123797 | A1* | 4/2022 | Files | H04B 7/0456 |
| 2022/0224394 | A1* | 7/2022 | Berggren | H04B 7/06964 |
| 2022/0353032 | A1 | 11/2022 | Abdelghaffar et al. | |
| 2023/0353264 | A1* | 11/2023 | Bai | G06N 3/08 |
| 2024/0396594 | A1* | 11/2024 | Choi | H04B 7/063 |

FOREIGN PATENT DOCUMENTS

| | | | |
|---|---|---|---|
| KR | 102319683 | B1 | 10/2021 |
| WO | 2020103011 | A1 | 5/2020 |
| WO | 2022084954 | A1 | 4/2022 |

* cited by examiner

*Primary Examiner* — Minh Trang T Nguyen

(57) ABSTRACT

Methods and apparatuses for throughput prediction. A base station includes a transceiver configured to receive a set of input metrics and a processor operably coupled to the transceiver. The processor is configured to calculate, based on the set of input metrics, a transmit antenna selection (TAS) throughput prediction and further configured to generate, based on the TAS throughput prediction, a predicted TAS throughput result.

20 Claims, 10 Drawing Sheets

DL channel sounding with SRS 'antenna switching' for T1R4

Possible SRS resource allocation for 'antenna switching' with T1R4

CQI-to-SINR mapping table

| CQI index | SINR (dB) |
| --- | --- |
| 0 | -5.2441 |
| 1 | -5.2441 |
| 2 | -3.475 |
| 3 | -1.131 |
| 4 | 1.351 |
| 5 | 3.561 |
| 6 | 5.479 |
| 7 | 7.14 |
| 8 | 9.285 |
| 9 | 11.478 |
| 10 | 12.846 |
| 11 | 15.25 |
| 12 | 17.534 |
| 13 | 19.934 |
| 14 | 22.196 |
| 15 | 23.866 |

FIG. 8

THROUGHPUT PREDICTION USING UL METRICS AND/OR REPORTED CSI

CROSS-REFERENCE TO RELATED APPLICATION AND CLAIM OF PRIORITY

This application claims priority under 35 U.S.C. § 119(e) to U.S. Provisional Patent Application No. 63/398,149 filed on Aug. 15, 2022, and U.S. Provisional Patent Application No. 63/464,116 filed on May 4, 2023. The above-identified provisional patent applications are hereby incorporated by reference in its entirety.

TECHNICAL FIELD

This disclosure relates generally to wireless networks. More specifically, this disclosure relates to throughput prediction.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides apparatuses and methods for throughput prediction.

In one embodiment, a base station (BS) is provided. The BS includes a transceiver configured to receive a set of input metrics and a processor operatively coupled to the transceiver. The processor is configured to calculate, based on the set of input metrics, a transmit antenna selection (TAS) throughput prediction. The processor is further configured to generate, based on the TAS throughput prediction, a predicted TAS throughput result.

In another embodiment, method of operating a BS is provided. The method includes receiving a set of input metrics, calculating, based on the set of input metrics, a transmit antenna selection (TAS) throughput prediction, and generating, based on the TAS throughput prediction, a predicted TAS throughput result.

In yet another embodiment, A non-transitory computer readable medium embodying a computer program is provided. The computer program includes program code that, when executed by a processor of a device, causes the device to receive a set of input metrics, calculate, based on the set of input metrics, a transmit antenna selection (TAS) throughput prediction, and generate, based on the TAS throughput prediction, a predicted TAS throughput result.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 8 illustrates an example CQI-to-SINR mapping table according to embodiments of the present disclosure;

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
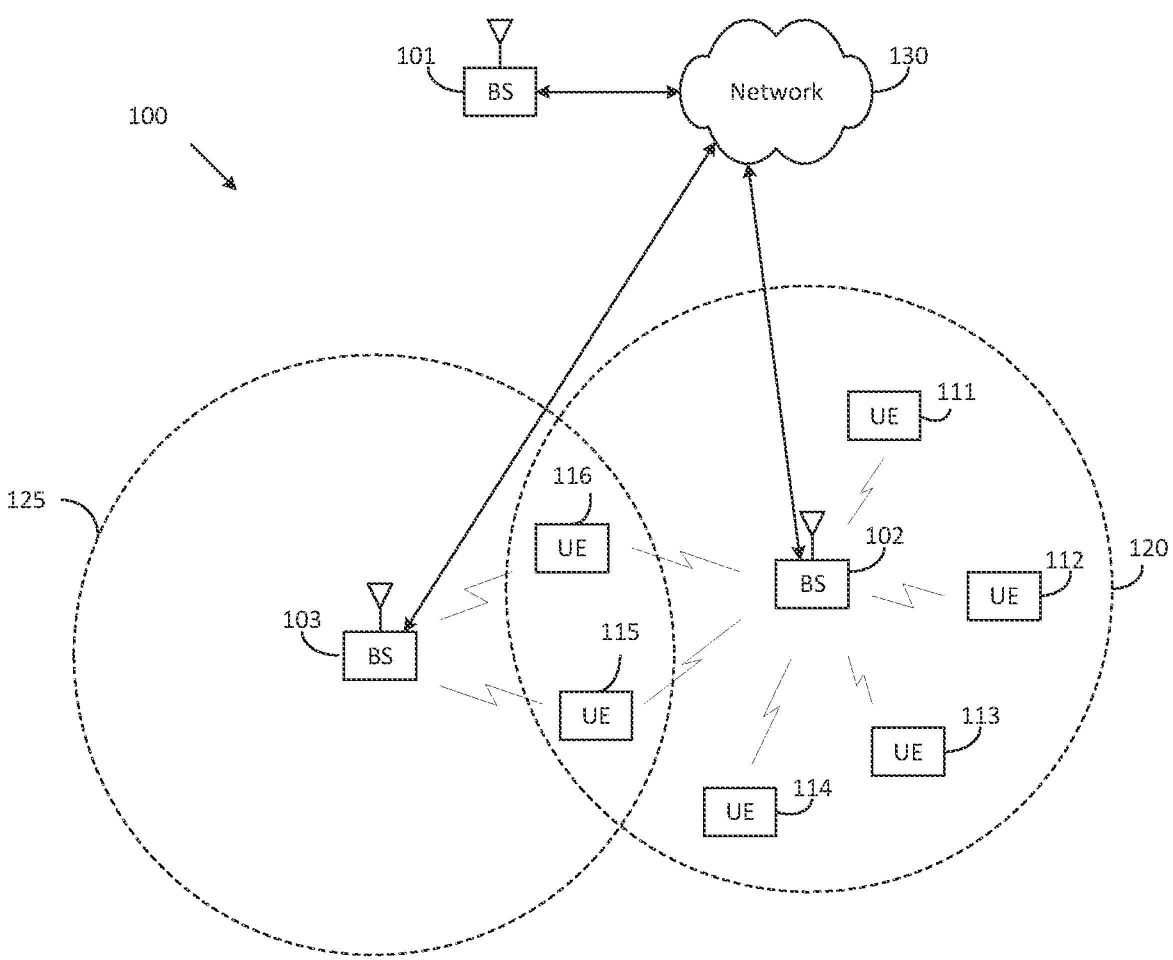
FIG. 1 illustrates an example wireless network according to embodiments of the present disclosure.
Figure 2:
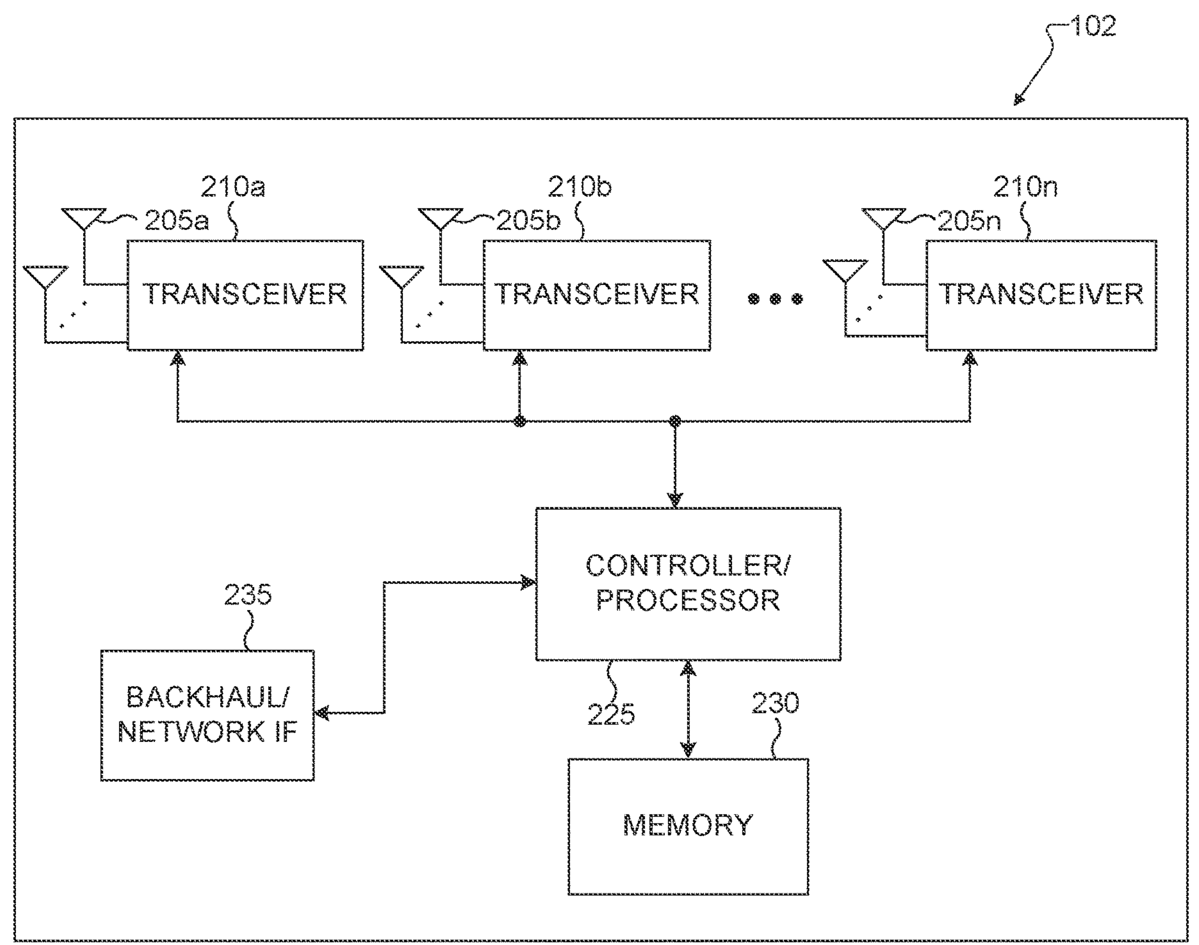
FIG. 2 illustrates an example gNB according to embodiments of the present disclosure.
Figure 3:
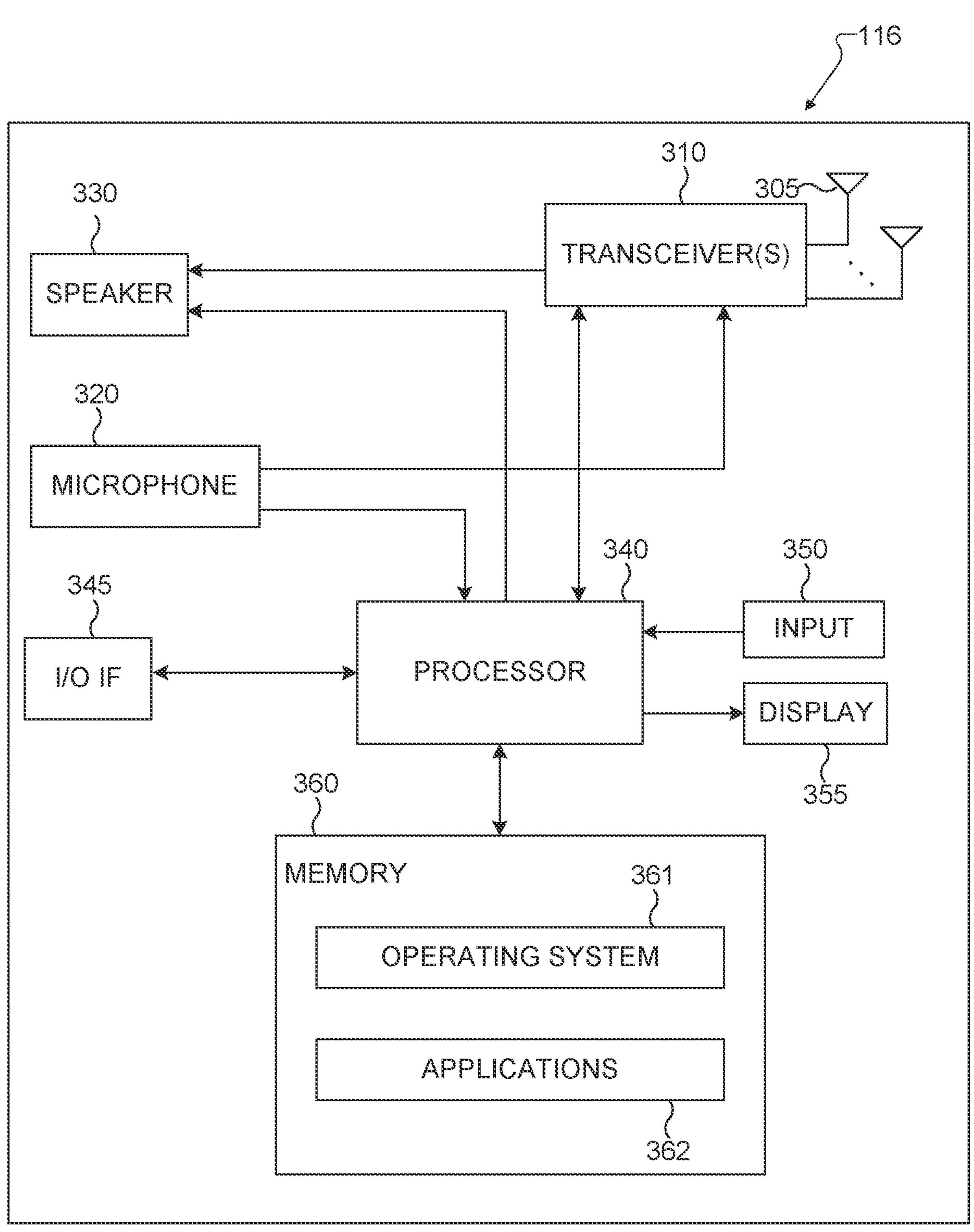
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only.

It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for throughput prediction. In certain embodiments, one or more of the gNBs 101-103 includes circuitry, programing, or a combination thereof, to support a throughput prediction in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas **205*a*-205*n*, multiple transceivers 210*a*-210*n*, a controller/processor 225, a memory 230, and a backhaul or network interface 235**.

The transceivers **210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225** may further process the baseband signals.

Transmit (TX) processing circuitry in the transceivers **210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n***.

The controller/processor 225 can include one or more processors or other processing devices that control the overall operation of the gNB 102. For example, the controller/processor 225 could control the reception of UL channel signals and the transmission of DL channel signals by the transceivers **210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225**.

The controller/processor 225 is also capable of executing programs and other processes resident in the memory 230, such as an OS and, for example, processes to support a throughput prediction as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or micro-controller.

The processor 340 is also capable of executing other processes and programs resident in the memory 360, for example, processes for a throughput prediction as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
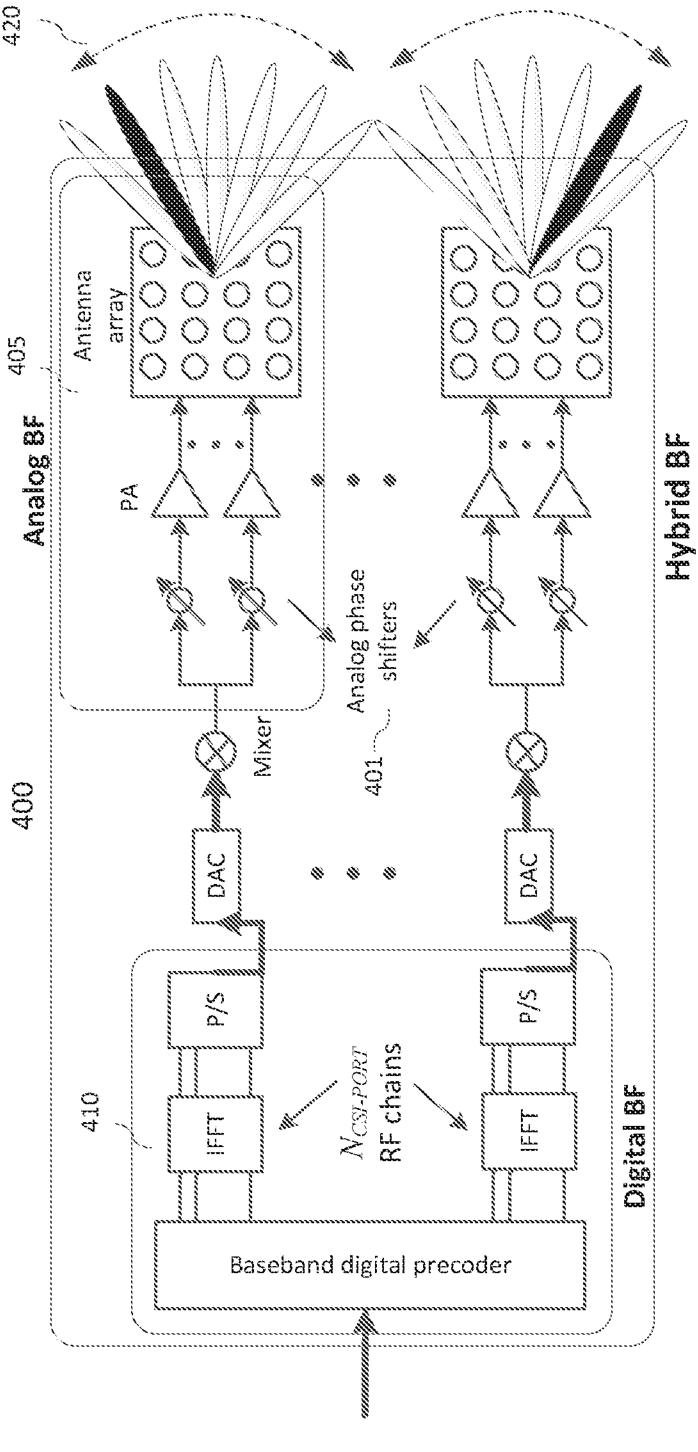
FIG. 4 illustrates example antenna blocks or arrays according to embodiments of the present disclosure.

FIG. 4 illustrates example antenna blocks or arrays 400 according to embodiments of the present disclosure. The embodiment of the antenna blocks or arrays 400 illustrated in FIG. 4 is for illustration only. Different embodiments of antenna blocks or arrays 400 could be used without departing from the scope of this disclosure.

A unit for downlink (DL) signaling or for uplink (UL) signaling on a cell is referred to as a slot and may include one or more symbols. A bandwidth (BW) unit is referred to as a resource block (RB). One RB includes a number of sub-carriers (SCs). For example, a slot may have duration of one millisecond and an RB may have a bandwidth of 180 KHz and include 12 SCs with inter-SC spacing of 15 KHz. A slot may be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. A UE may be indicated a spatial setting for a PDCCH reception based on a configuration of a value for a transmission configuration indication state (TCI state) of a control resource set (CORESET) where the UE receives the PDCCH. The UE may be indicated by a spatial setting for a PDSCH reception based on a configuration by higher layers or based on activation or indication by MAC CE or based on an indication by a DCI format scheduling the PDSCH reception of a value for a TCI state. The gNB may configure the UE to receive signals on a cell within a DL bandwidth part (BWP) of the cell DL BW.

A gNB (such as BS 103 of FIG. 1) transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE (such as UE 116 of FIG. 1) may determine CSI-RS transmission parameters through DL control signaling or higher layer signaling, such as an RRC signaling from a gNB. Transmission instances of a CSI-RS may be indicated by DL control signaling or configured by higher layer signaling. A DMRS is transmitted only in the BW of a respective PDCCH or PDSCH and a UE may use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH may be transmitted over a variable number of slot symbols including one slot symbol. The gNB may configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information may be configured to be with a smaller granularity than per TB and may be per data code block (CB) or per group of data CBs where a data TB includes a number of data.

A CSI report from a UE may include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI)

indicating a transmission rank for a PDSCH. UL RS includes DMRS and SRS. DMRS is transmitted only in a BW of a respective PUSCH or PUCCH transmission. A gNB may use a DMRS to demodulate information in a respective PUSCH or PUCCH. SRS is transmitted by a UE to provide a gNB with an UL CSI and, for a TDD system, an SRS transmission may also provide a PMI for DL transmission. Additionally, in order to establish synchronization or an initial higher layer connection with a gNB, a UE may transmit a physical random-access channel (PRACH).

Rel-14 LTE and Rel-15 NR support up to 32 CSI-RS antenna ports which enable an eNB or a gNB to be equipped with a large number of antenna elements (such as 64 or 128). A plurality of antenna elements may then be mapped onto one CSI-RS port. For mmWave bands, although a number of antenna elements may be larger for a given form factor, a number of CSI-RS ports, that may correspond to the number of digitally precoded ports, may be limited due to hardware constraints (such as the feasibility to install a large number of ADCs/DACs at mmWave frequencies) as illustrated in FIG. 4. Then, one CSI-RS port may be mapped onto a large number of antenna elements that may be controlled by a bank of analog phase shifters 401. One CSI-RS port may then correspond to one sub-array which produces a narrow analog beam through analog beamforming 405. This analog beam may be configured to sweep across a wider range of angles (420) by varying the phase shifter bank across symbols or slots/subframes. The number of sub-arrays (equal to the number of RF chains) is same as the number of CSI-RS ports $N_{CSI\text{-}PORT}$. A digital beamforming unit 410 performs a linear combination across $N_{CSI\text{-}PORT}$ analog beams to further increase a precoding gain. While analog beams are wideband (hence not frequency-selective), digital precoding may be varied across frequency sub-bands or resource blocks. Receiver operation may be conceived analogously.

Since the above system utilizes multiple analog beams for transmission and reception (wherein one or a small number of analog beams are selected out of a large number, for instance, after a training duration that is occasionally or periodically performed), the term “multi-beam operation” is used to refer to the overall system aspect. This includes, for the purpose of illustration, indicating the assigned DL or UL transmit (TX) beam (also termed “beam indication”), measuring at least one reference signal for calculating and performing beam reporting (also termed “beam measurement” and “beam reporting”, respectively), and receiving a DL or UL transmission via a selection of a corresponding receive (RX) beam.

The above system is also applicable to higher frequency bands such as >52.6 GHz. In this case, the system may employ only analog beams. Due to the O2 absorption loss around 60 GHz frequency (~10 dB additional loss per 100 m distance), a larger number and narrower analog beams (hence larger number of radiators in the array) are needed to compensate for the additional path loss.

Although FIG. 4 illustrates one example antenna blocks or arrays 400, various changes may be made to FIG. 4. For example, various components in FIG. 4 could be combined, further subdivided, or omitted and additional components could be added according to particular needs.

In modern wireless systems, such as those described regarding FIGS. 1-4, different modes of operation may be utilized for MIMO transmissions. For example, in some circumstances MIMO transmissions may utilize a precoding matrix indicator (PMI) mode. In other circumstances, a transmit antenna selection (TAS) mode may be utilized. Depending on the circumstances, for example the conditions near a BS, the position of a UE, etc. better throughput may be obtained by utilizing PMI mode, while in other circumstances better throughput may be obtained by utilizing TAS mode. For instance, it has been observed that in strong line of sight (LOS) conditions that performance may be degraded when utilizing TAS rather than PMI. To improve throughput performance, it may be beneficial to dynamically alternate between TAS and PMI modes as conditions change. To select the best mode between PMI and TAS, a throughput prediction based mode adaptation scheme may be utilized as illustrated in the example of FIG. 5.

Figure 5:
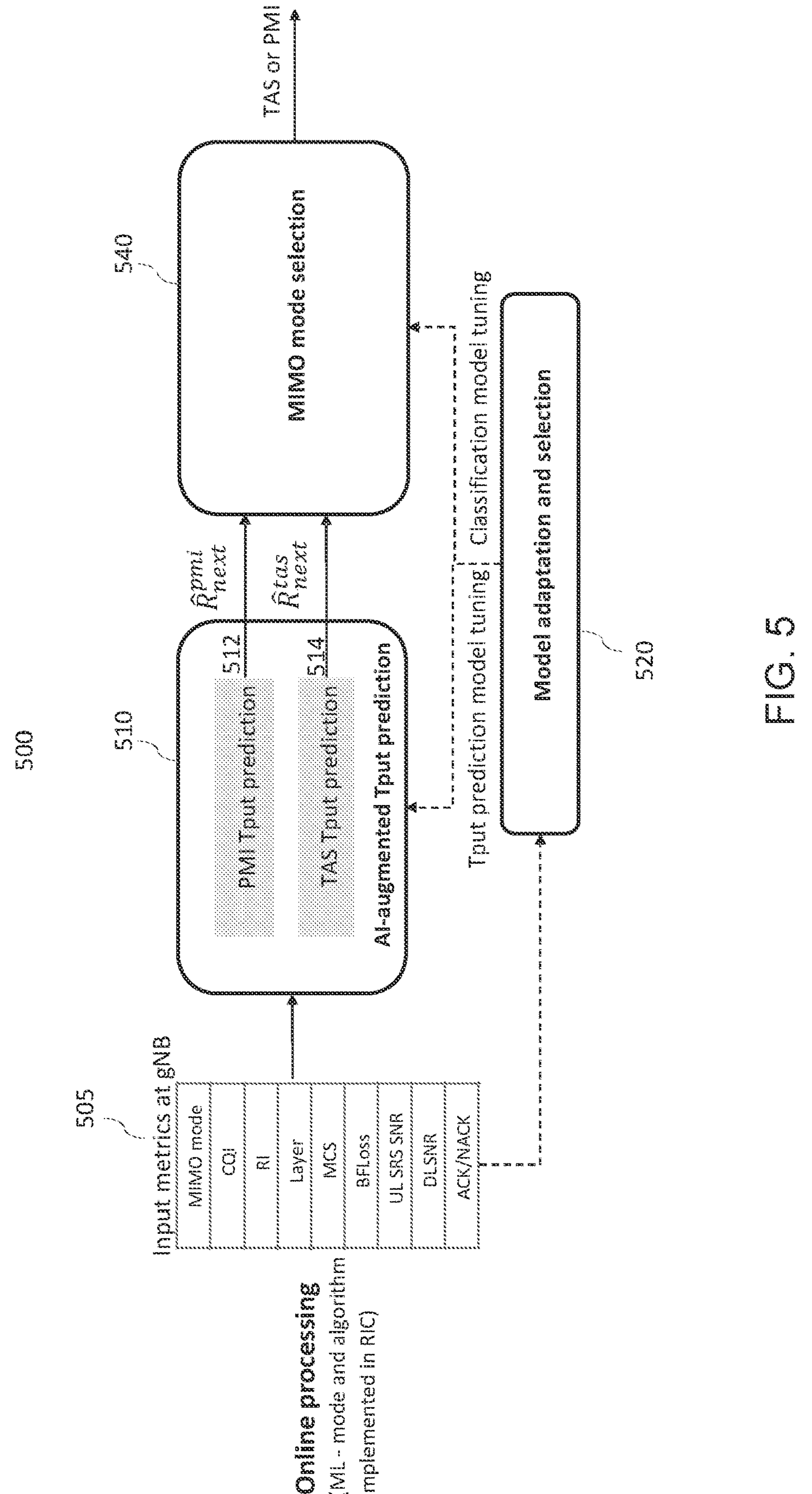
FIG. 5 illustrates an example block diagram for an AI-augmented MIMO mode adaptation method according to embodiments of the present disclosure.

FIG. 5 illustrates an example block diagram for an AI-augmented MIMO mode adaptation method 500 according to embodiments of the present disclosure. The embodiment of the AI-augmented MIMO mode adaptation method in FIG. 5 is for illustration only. Other embodiments of an AI-augmented MIMO mode adaptation method could be used without departing from the scope of this disclosure.

In the example of FIG. 5, a gNB (such as BS 103 of FIG. 1) receives a set of input metrics 505. Metrics 505 may include, but are not limited to metrics such as MIMO mode, channel quality indicator (CQI), rank indicator (RI), number of layers, modulation and coding scheme (MCS), beamforming loss (BFLoss), UL SRS signal-to-noise ratio (SNR), DL SNR, HARQ ACK/NACK, etc. These metrics may be available to the BS from SRS and PMI.

Metrics 505 may be utilized by the gNB to perform AI-augmented throughput prediction block 510 and model adaptation and selection 520. During prediction 510, the gNB generates a PMI throughput prediction block 512 and a TAS throughput prediction 514. Predictions 512 and 514 may be based on models selected and tuned by the gNB at block 520.

Based on the predictions generated in block 510, the gNB may perform a MIMO mode selection 540 and select between at least a TAS or a PMI mode. The selection may be based on a model selected and tuned by the gNB at block 520.

Although FIG. 5 illustrates one example of an AI-augmented MIMO mode adaptation method, various changes may be made to FIG. 5. For example, the input metrics may change, the models may change, etc.

Deriving a robust model for TAS throughput prediction is one of the most challenging tasks in the overall design of a MIMO mode adaption scheme. The present disclosure describes a new processing framework of TAS throughput prediction for massive MIMO (mMIMO) as illustrated in FIGS. 6-10.

Figure 6:
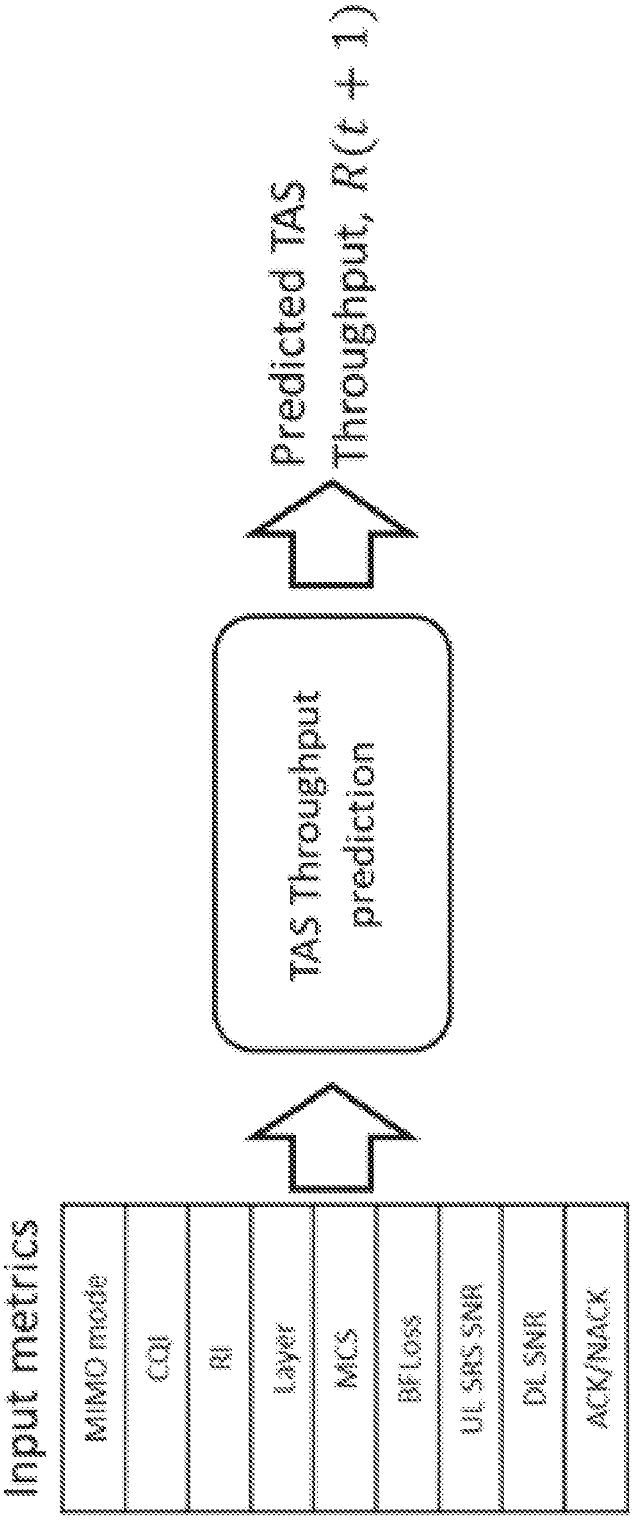
FIG. 6 illustrates an example block diagram for a TAS throughput prediction method according to embodiments of the present disclosure.

FIG. 6 illustrates an example block diagram for a TAS throughput prediction method according to embodiments of the present disclosure. The embodiment of the TAS throughput prediction method in FIG. 6 is for illustration only. Other embodiments of a TAS throughput prediction method could be used without departing from the scope of this disclosure.

In the example of FIG. 6, a mMIMO BS (such as BS 103 of FIG. 1) for TAS throughput prediction comprises a transceiver configured to receive sounding reference signal (SRS) and precoding matrix indicator (PMI) from Physical Uplink Shared Channel (PUSCH) from a UE (such as UE116 of FIG. 1), and a TAS throughput prediction unit which uses all or sub-set of the following metrics for predicting TAS throughput: MIMO mode, CQI, RI, number of layers, MCS, BFLoss, UL SRS SNR, DL SNR, HARQ ACK/NACK. These metrics are available to the BS from SRS and PMI.

Figure 7:
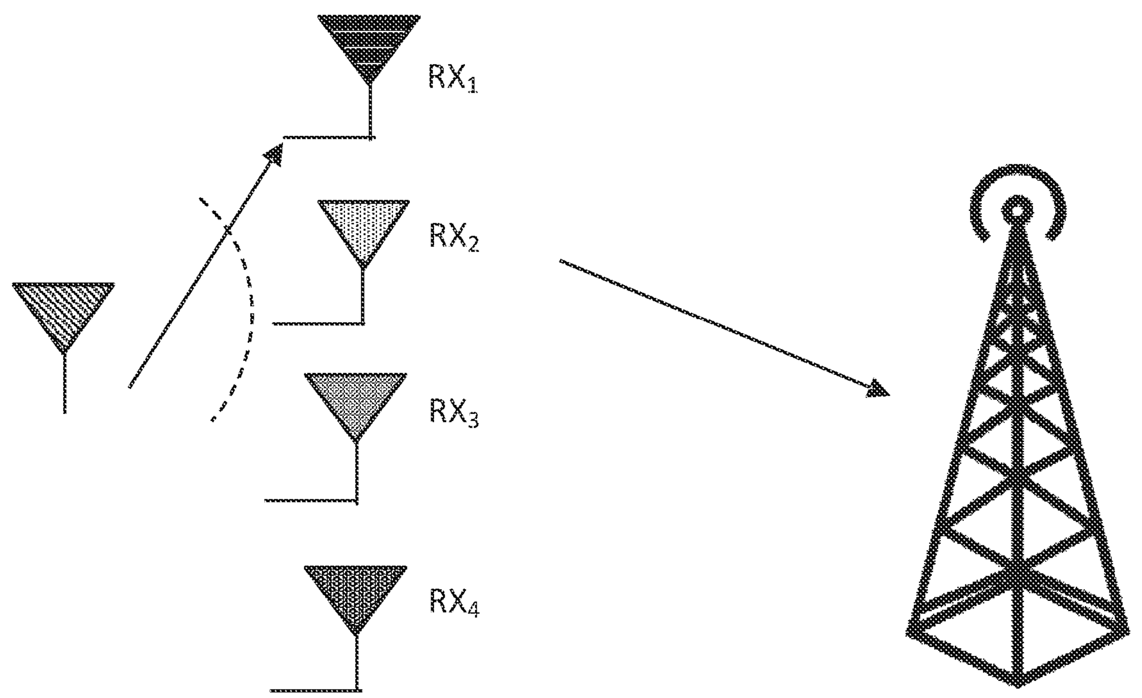
FIG. 7 illustrates an example of antenna switching according to embodiments of the present disclosure.
Figure 7:
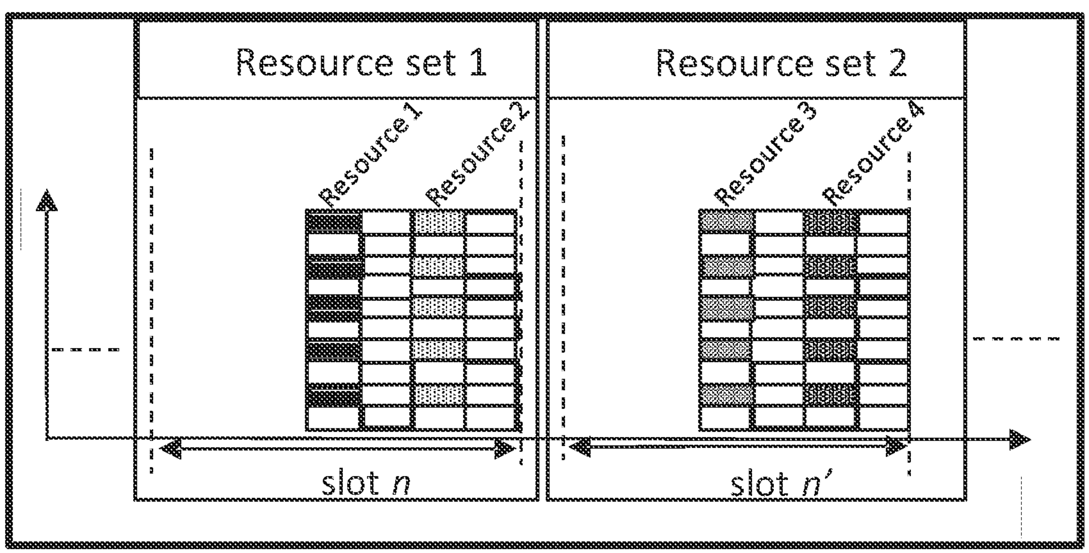

DL Channels associated with different SRS RX ports of the UE are sounded using SRS transmission with T1R4 'antenna switching' UE transceiver as illustrated in FIG. 7.

FIG. 7 illustrates an example of antenna switching according to embodiments of the present disclosure. The embodiment of antenna switching in FIG. 7 is for illustration only. Other embodiments of antenna switching could be used without departing from the scope of this disclosure.

In the example of FIG. 7, let the channel associated with i-th, i∈{0, 1, 2, 3} RX port and n-th eNB antenna element be, $h_i(n)$, n∈{0, 1, N−1}. Then, the estimated channel of i-th RX port, and n-th BS antenna element in the UL, $\tilde{h}_i(n)$ may be given as $$\tilde{h}_i(n) = \sqrt{P_{tr}}\, h_i(n) + n_i^{UL}(n), \tag{1}$$

where $P_{tr}$ is the training TX power which takes into consideration all the losses at the TX side. Further, as channel sounding for all RX ports are done using the same TX port, i.e. SRS transmission with T1R4 'antenna switching', the same training TX power is assumed across all RX ports to be sounded.

$$n_i^{UL}$$

is the complex Gaussian noise from $$\mathcal{CN}\{0, \sigma_{UL}^2\}.$$

Although FIG. 7 illustrates one example of antenna switching, various changes may be made to FIG. 7. For example, the number of antennas may change, the resource sets may change, etc.

In the following example, a TAS throughput prediction is generated based on a single model, though it should be understood that a TAS throughput prediction may generated based on multiple models, selecting a particular model, etc. Given Equation (1), and assuming that the UL SRS SNR input to TAS throughput prediction unit is the avg. SNR over all BS antenna elements, UL SNR of i-th SRS port, $$SNR_i^{UL}$$

may be given as, $$SNR_i^{UL} = \frac{1}{N}\frac{P_{tr}\|h_i\|^2}{\sigma_{UL}^2}. \tag{2}$$

where the channel of i-th RX port, $h_i=[h_i(0)h_i(1)\ \ldots\ h_i(N-1)]^T$.

Next, the DL received signal at the i-th RX port can be given as, $$y_i^{DL} = \sqrt{P_{DL}}\, h_i^H f_i s + n_i^{DL}. \tag{3}$$

Here, the DL precoding vector $$f_i = \frac{1}{\|h_i + n_i\|}(h_i + n_i) \approx \frac{1}{\sqrt{(1+\rho)}\,\|h_i\|}(h_i + n_i)$$

where $$\rho = \frac{\|n_i\|^2}{\|h_i\|^2}.$$

$P_{DL}$ is the DL Tx power and $$n_i^{DL}$$

is the complex Gaussian noise from $$\mathcal{CN}\{0, \sigma_{DL}^2\}.$$

Subsequently, using Equation (2) and Equation (3), and considering the channel reciprocity, DL SNR observed at the i-th RX port may be approximately given as, $$SNR_i^{DL} \approx \frac{P_{DL}}{\sigma_{DL}^2} \times \frac{1}{(1+\rho)} \times \frac{N\sigma_{UL}^2 \times SNR_i^{UL}}{P_{tr}} \tag{4}$$

SNR captured in Equation (4) is for conjugate beamforming precoding. Assuming i-th RX port is mapped to l-th DL layer, for zero-force (ZF) beamforming, we may calculate the SNR of l-th DL layer by appropriately scaling $$SNR_l^{DL}$$

in Equation (4) as, $$BF_{LOSS_l} \times SNR_l^{DL}$$

where $BF_{LOSS_l}$ is the beamforming loss parameter of l-th layer. With that, instantaneous TAS throughput at l-th DL layer may be predicted approximately as, $$R_l(t+1) \approx \alpha_{tas,1} \times \log\{1 + \tilde{\alpha}_{tas,2} \times BF_{LOSS_l}(t) \times SNR_l^{DL}(t)\} \tag{5}$$

where $\alpha_{tas,1}$ and $\tilde{\alpha}_{tas,2}$ are some parameters to be learnt/determined through an offline model training procedure. By applying Equation (4) in Equation (5), $R_l(t+1)$ can be expressed using UL SNR as, $$R_l(t+1) \approx \alpha_{tas,1} \times \log \left\{1 + \tilde{\alpha}_{tas,2} \times \frac{P_{DL}}{\sigma_{DL}^2} \times \frac{1}{(1+\rho)} \times \frac{N\sigma_{UL}^2}{P_{tr}} \times BF_{LOSS_l}(t) \times SNR_l^{UL}(t)\right\}. \tag{6}$$

DL SNR in Equation (6), $$\frac{P_{DL}}{\sigma_{DL}^2}$$

may be approximates by mapping the reported CQI value to an appropriate SINR value, SINR_Map(CQI). Accordingly, Equation (6) may be updated as follows:

$$R_l(t+1) \approx \alpha_{tas,1} \times \log \left\{1 + \tilde{\alpha}_{tas,2} \times \frac{1}{(1+\rho)} \times \frac{N\sigma_{UL}^2}{P_{tr}} \times \text{SINR\_Map}(CQI) \times BF_{LOSS_l}(t) \times SNR_l^{UL}(t)\right\}. \quad (7)$$

A table capturing different CQI values and corresponding SINR values may be defined. For instance, in one embodiment, CQI-to-SINR mapping table may be defined as illustrated in FIG. 8.

FIG. 8 illustrates an example CQI-to-SINR mapping table according to embodiments of the present disclosure. The embodiment of the CQI-to-SINR mapping table in FIG. 8 is for illustration only. Other embodiments of a CQI-to-SINR mapping table could be used without departing from the scope of this disclosure.

Although FIG. 8 illustrates one example of a CQI-to-SINR mapping table, various changes may be made to FIG. 8. For example, the CQI index values may change, the SINR values may change, etc.

In another embodiment, CQI value within the model in Equation (7) for TAS throughput prediction may be used.

As another embodiment, two or multiple throughput prediction models can be defined. Each model may be associated with different input metrics or with the same input metric but with different thresholding values.

Figure 9:
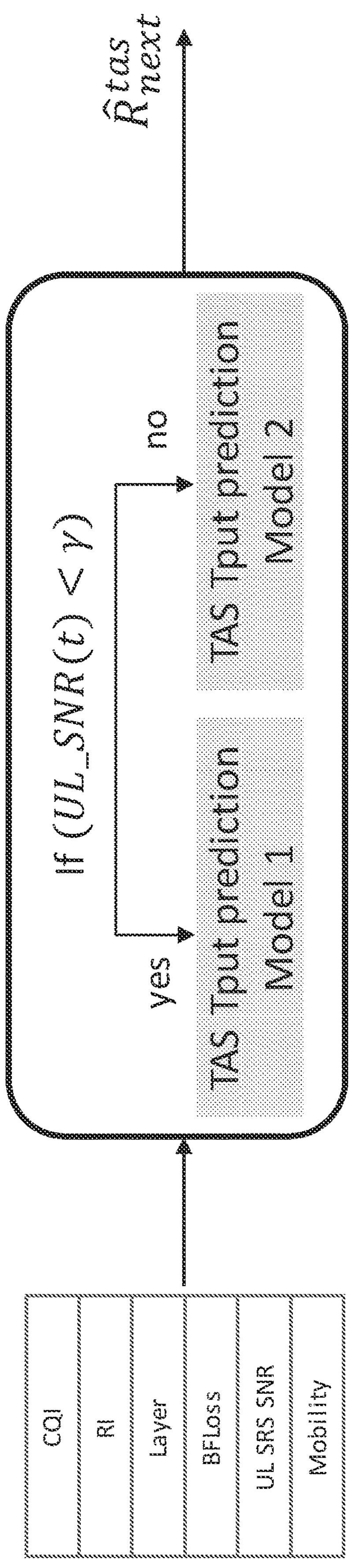
FIG. 9 illustrates an example block diagram for a multiple model TAS throughput prediction method according to embodiments of the present disclosure.

FIG. 9 illustrates an example block diagram for a multiple model TAS throughput prediction method according to embodiments of the present disclosure. The embodiment of the TAS throughput prediction method in FIG. 9 is for illustration only. Other embodiments of a TAS throughput prediction method could be used without departing from the scope of this disclosure.

In one embodiment, two throughput prediction models based on UL SNR may be defined as follows:

$$R_l(t+1) \approx \alpha_{tas,1}(\text{UL\_SNR}) \times \log \left\{1 + \tilde{\alpha}_{tas,2}(\text{UL\_SNR}) \times \frac{1}{(1+\rho)} \times \frac{N\sigma_{UL}^2}{P_{tr}} \times \text{SINR\_Map}(CQI) \times BF_{LOSS_l}(t) \times SNR_l^{UL}(t)\right\}. \quad (8)$$

where, $$\{\alpha_{tas,1}(\text{UL\_SNR}), \tilde{\alpha}_{tas,2}(\text{UL\_SNR})\} = \begin{cases} \{\alpha_{tas,1}^1, \tilde{\alpha}_{tas,2}^1\}, & \text{UL\_SNR}(t) < \gamma \\ \{\alpha_{tas,1}^2, \tilde{\alpha}_{tas,2}^2\}, & \text{UL\_SNR}(t) \geq \gamma \end{cases}$$

with $\gamma$ as a pre-determined threshold.

Here, if UL_SNR(t) is smaller (greater) than the $\gamma$, $$\{\alpha_{tas,1}^1, \alpha_{tas,2}^1\}(\{\alpha_{tas,1}^2, \alpha_{tas,2}^2\})$$

model is selected.

In another embodiment, UL SNR considered for throughput prediction model selection in Equation (8) may be the maximum UL SNR across all RX ports.

$$\text{UL\_SNR} = \max_i \{SNR_i^{UL}\}$$

In another embodiment, UL SNR considered for throughput prediction model selection in Equation (8) may be the UL SNR of a specific SRS port.

In another embodiment, the throughput prediction model selection may be based on a UE mobility profile. For example, a particular model may be selected based on a UE traveling at a low speed (e.g. <10 miles per hour), while another model may be selected based on the UE traveling at a higher speed (e.g. >10 miles per hour).

As another embodiment, UL SNR considered for throughput prediction model selection in Equation (8) may be the SNR of a pre-defined RX port. For example, $$\text{UL\_SNR} = SNR_1^{UL}$$

such that, UL SNR of the 1st RX port is always considered for TAS throughput prediction model selection.

The predicted throughput across all layers for (t+1)-th instance, R(t+1) may be calculated considering aforementioned throughput prediction model as, $$R(t+1) \approx \min\left\{\frac{1}{N_{layer}(t)} \sum_{l=1}^{N_{layer}(t)} R_l(t+1), R_{max}^{tas}\right\}, \quad (9)$$

where $N_{layer}(t)$ is the number of layers and $$R_{max}^{tas}$$

is the maximum possible throughput for TAS due to the limitations in modulation and coding schemes (MCS).

In the operation of TAS throughput prediction, the BS may use one or more metrics from the set, {MIMO mode, CQI, RI, number of layers, MCS, BFLoss, UL SINR, DL SINR, HARQ ACK/NACK} observed at t'(<t+1)-th time instance. Then by using those selected metrics in Equation (9), throughput at (t+1)-th instance, R(t+1) may be predicted.

In one embodiment, DL SNR, $$SNR_i^{DL}$$

may be calculated using UL SNR, $$SNR_i^{UL}$$

as captured in Equation (4) for time division duplexing (TDD) systems.

In one another embodiment, DL SNR for l-th DL layer of zero-force beamforming may be approximately calculated as $$\left(BF_{LOSS_l}(t) \times SNR_l^{DL}(t)\right)$$

where $BF_{Loss_l}$ is the beamforming loss parameter of l-th DL layer.

In another embodiment, a BS may use UL SRS SNR metric of i-th RX port, $$SNR_i^{UL}$$

in Equation (2) observed at time instance t' (<t+1) for predicting the DL throughput at (t+1)-th time instance.

In one embodiment $$\{\alpha_{tas,1}^k, \tilde{\alpha}_{tas,2}^k\},$$

where k=1, . . . K with K being the number of different throughput prediction models available, may be learnt for different cells or different sites (hence cell/site specific models). Further, these models can be common to all cells/sites and hence learnt jointly.

In another embodiment, these models may be learnt UE specifically as well. In addition, there may be multiple pre-defined value sets defined for those two model parameters and based on some criteria, one value set out of those pre-defined value sets may be identified.

In another embodiment, $\alpha_{tas,2}$(UL_SNR) in Equation (8) may be defined as follows:

$$\alpha_{tas,2}(\text{UL\_SNR}) = \tilde{\alpha}_{tas,2}(\text{UL\_SNR}) \times \frac{1}{(1+\rho)} \times \frac{N\sigma_{UL}^2}{P_{tr}}$$

Similar to Equation (8), different throughput prediction models based on $\{\alpha_{tas,1}(\text{UL\_SNR}),\alpha_{tas,2}(\text{UL}_{SNR})\}$ may then be defined. In one embodiment, following two throughput prediction models based on UL SNR may be defined $$\{\alpha_{tas,1}(\text{UL\_SNR}), \alpha_{tas,2}(UL_{SNR})\} = \begin{cases} \{\alpha_{tas,1}^1, \alpha_{tas,2}^1\}, \text{UL\_SNR}(t) < \gamma \\ \{\alpha_{tas,1}^2, \alpha_{tas,2}^2\}, \text{UL\_SNR}(t) \geq \gamma \end{cases}$$

In one embodiment $$\{\alpha_{tas,1}^k, \alpha_{tas,2}^k\},$$

where k=1, . . . K with K being the number of different throughput prediction models available, may be learnt for different cells or different sites (hence cell/site specific models). Further, these models may be common to all cells/sites and hence learnt jointly.

In another embodiment, these models may be learnt UE specifically as well. In addition, there may be multiple pre-defined value sets defined for those two model parameters and based on some criteria, one value set out of those pre-defined value sets may be identified.

In another embodiment BF loss may be calculated based on the correlation between precoders of different layers when ZF beamforming is considered.

Although FIG. 9 illustrates one example of a multiple model TAS throughput prediction method, various changes may be made to FIG. 9. For example, the input metrics may change, the number of models may change, the threshold may change, etc.

Figure 10:
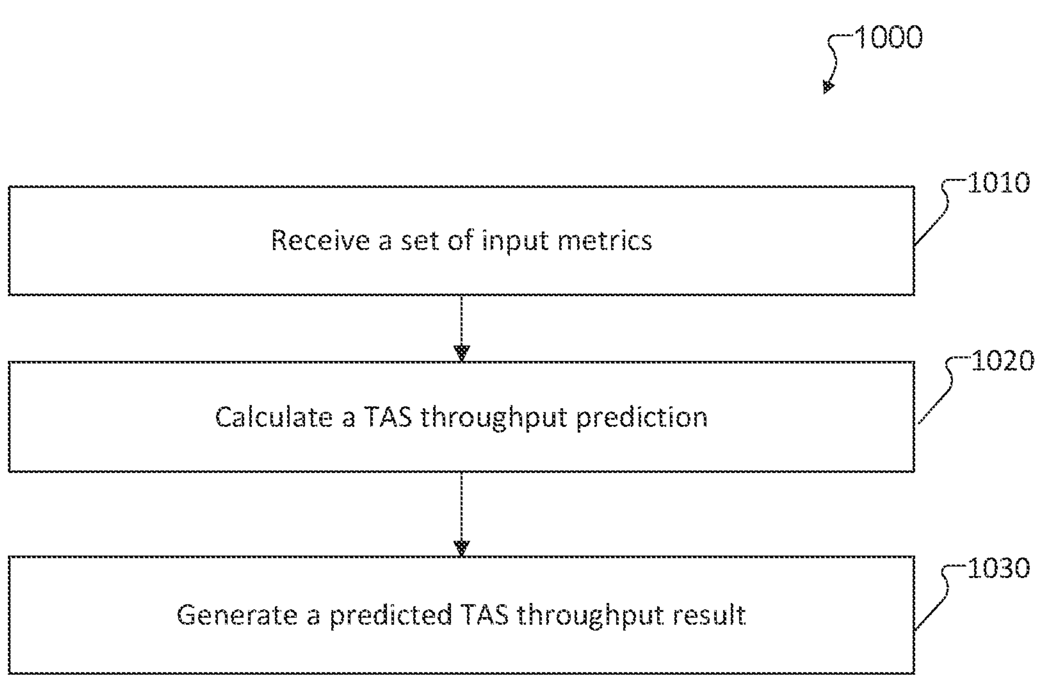
FIG. 10 illustrates an example method of throughput prediction according to embodiments of the present disclosure.

FIG. 10 illustrates an example method 1000 of throughput prediction according to embodiments of the present disclosure. An embodiment of the method illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 10, the method 1000 begins at step 1010. At step 1010, a BS receives a set of input metrics. For example, the input metrics may be similar as described regarding FIG. 5-6. At step 1020, the BS calculates a TAS throughput prediction. The throughput prediction may be calculated based on the received input metrics. For example, the throughput prediction may be calculated similar as described regarding FIGS. 5-9. At step 1030, the BS generates a predicted TAS throughput result. The predicted TAS throughput result may be generated based on the TAS throughput prediction. For example, the TAS throughput may be generated similar as described regarding FIGS. 5-6.

Although FIG. 10 illustrates one example of a method 1000 of throughput prediction, various changes may be made to FIG. 10. For example, while shown as a series of steps, various steps in FIG. 10 could overlap, occur in parallel, occur in a different order, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A base station (BS) comprising:

a transceiver configured to receive a set of input metrics; and a processor operably coupled to the transceiver, the processor configured to:

calculate, based on the set of input metrics, a transmit antenna selection (TAS) throughput prediction;

generate, based on the TAS throughput prediction, a predicted TAS throughput result; and select a TAS multiple input multiple output (MIMO) mode based on the predicted TAS throughput result exceeding a predicted throughput result for a different MIMO mode.

2. The base station of claim 1, wherein:

the TAS throughput prediction is a single model throughput prediction, the set of input metrics comprises at least one metric derived from a sounding reference signal (SRS), and the TAS throughput prediction is calculated based on an uplink (UL) signal to interference and noise ratio (SINR) value, a beamforming loss (BFloss), a first parameter identified from an offline model training procedure, and a second parameter identified from the offline model training procedure.

3. The base station of claim 2, wherein:

the set of input metrics further comprises at least one metric derived from a channel state information (CSI) report, and the TAS throughput prediction is calculated based on mapping a reported channel quality indicator (CQI) to a signal to interference and noise ratio (SINR) value.

4. The base station of claim 1, wherein:

the TAS throughput prediction is a multiple model throughput prediction, and the set of input metrics comprises at least one metric derived from a sounding reference signal (SRS) and at least one metric derived from a channel state information (CSI) report.

5. The base station of claim 4, wherein the processor is further configured to select a TAS throughput prediction model based on a maximum uplink (UL) signal to noise ratio (SNR) across all receive (RX) ports, wherein the TAS throughput prediction is calculated based on the selected TAS throughput prediction model.

6. The base station of claim 4, wherein the processor is further configured to select a TAS throughput prediction model based on an uplink (UL) signal to noise ratio (SNR) of a specific SRS port, wherein the TAS throughput prediction is calculated based on the selected TAS throughput prediction model.

7. The base station of claim 4, wherein the processor is further configured to select a TAS throughput prediction model based on a UE mobility profile, wherein the TAS throughput prediction is calculated based on the selected TAS throughput prediction model.

8. A method of operating a base station (BS), the method comprising:

receiving a set of input metrics;

calculating, based on the set of input metrics, a transmit antenna selection (TAS) throughput prediction;

generating, based on the TAS throughput prediction, a predicted TAS throughput result; and selecting a TAS multiple input multiple output (MIMO) mode based on the predicted TAS throughput result exceeding a predicted throughput result for a different MIMO mode.

9. The method of claim 8, wherein:

the TAS throughput prediction is a single model throughput prediction, the set of input metrics comprises at least one metric derived from a sounding reference signal (SRS), and the TAS throughput prediction is calculated based on an uplink (UL) signal to interference and noise ratio (SINR) value, a beamforming loss (BFloss), a first parameter identified from an offline model training procedure, and a second parameter identified from the offline model training procedure.

10. The method of claim 9, wherein:

the set of input metrics further comprises at least one metric derived from a channel state information (CSI) report, and the TAS throughput prediction is calculated based on mapping a reported channel quality indicator (CQI) to a signal to interference and noise ratio (SINR) value.

11. The method of claim 8, wherein:

the TAS throughput prediction is a multiple model throughput prediction, and the set of input metrics comprises at least one metric derived from a sounding reference signal (SRS) and at least one metric derived from a channel state information (CSI) report.

12. The method of claim 11, further comprising:

selecting a TAS throughput prediction model based on a maximum uplink (UL) signal to noise ratio (SNR) across all receive (RX) ports, wherein the TAS throughput prediction is calculated based on the selected TAS throughput prediction model.

13. The method of claim 11, further comprising:

selecting a TAS throughput prediction model based on an uplink (UL) signal to noise ratio (SNR) of a specific SRS port, wherein the TAS throughput prediction is calculated based on the selected TAS throughput prediction model.

14. The method of claim 11, further comprising:

selecting a TAS throughput prediction model based on a UE mobility profile, wherein the TAS throughput prediction is calculated based on the selected TAS throughput prediction model.

15. A non-transitory computer readable medium embodying a computer program, the computer program comprising program code that, when executed by a processor of a device, causes the device to:

receive a set of input metrics;

calculate, based on the set of input metrics, a transmit antenna selection (TAS) throughput prediction;

generate, based on the TAS throughput prediction, a predicted TAS throughput result; and select a TAS multiple input multiple output (MIMO) mode based on the predicted TAS throughput result exceeding a predicted throughput result for a different MIMO mode.

16. The non-transitory computer readable medium of claim 15, wherein:

the TAS throughput prediction is a single model throughput prediction, the set of input metrics comprises at least one metric derived from a sounding reference signal (SRS), and the TAS throughput prediction is calculated based on an uplink (UL) signal to interference and noise ratio (SINR) value, a beamforming loss (BFloss), a first parameter identified from an offline model training procedure, and a second parameter identified from the offline model training procedure.

17. The non-transitory computer readable medium of claim 16, wherein:

the set of input metrics further comprises at least one metric derived from a channel state information (CSI) report, and the TAS throughput prediction is calculated based on mapping a reported channel quality indicator (CQI) to a signal to interference and noise ratio (SINR) value.

18. The non-transitory computer readable medium of claim 15, wherein:

the TAS throughput prediction is a multiple model throughput prediction, the set of input metrics comprises at least one metric derived from a sounding reference signal (SRS) and at least one metric derived from a channel state information (CSI), and the computer program further comprises program code that, when executed by the processor, causes the device to select a TAS throughput prediction model based on a maximum uplink (UL) signal to noise ratio (SNR) across all receive (RX) ports, wherein the TAS throughput prediction is calculated based on the selected TAS throughput prediction model.

19. The non-transitory computer readable medium of claim 15, wherein:

the TAS throughput prediction is a multiple model throughput prediction, the set of input metrics comprises at least one metric derived from a sounding reference signal (SRS) and at least one metric derived from a channel state information (CSI), and the computer program further comprises program code that, when executed by the processor, causes the device to select a TAS throughput prediction model based on an uplink (UL) signal to noise ratio (SNR) of a specific SRS port, wherein the TAS throughput prediction is calculated based on the selected TAS throughput prediction model.

20. The non-transitory computer readable medium of claim 15, wherein:

the TAS throughput prediction is a multiple model throughput prediction, the set of input metrics comprises at least one metric derived from a sounding reference signal (SRS) and at least one metric derived from a channel state information (CSI), and the computer program further comprises program code that, when executed by the processor, causes the device to selecting a TAS throughput prediction model based on a UE mobility profile, wherein the TAS throughput prediction is calculated based on the selected TAS throughput prediction model.

* * * * *